United States Patent [19]

Crice

[11] Patent Number: 4,736,299

[45] Date of Patent: Apr. 5, 1988

[54] REFLECTION SEISMOGRAPH METHOD AND APPARATUS

[75] Inventor: Douglas B. Crice, Saratoga, Calif.

[73] Assignee: Geometrics, Inc., Sunnyvale, Calif.

[21] Appl. No.: 618,024

[22] Filed: Jun. 7, 1984

[51] Int. Cl.$^4$ ............................................. G01V 1/16
[52] U.S. Cl. ...................................... 364/421; 367/77
[58] Field of Search ...................... 364/200, 900, 421; 367/38, 40, 60, 77

[56] References Cited

U.S. PATENT DOCUMENTS

| | | | |
|---|---|---|---|
| 3,742,289 | 6/1973 | Koeijmans | 364/200 |
| 3,882,446 | 5/1975 | Brittan et al. | 364/200 |
| 3,946,357 | 3/1976 | Weinstein et al. | 367/77 |
| 4,161,782 | 7/1979 | McCracken | 364/179 |
| 4,202,048 | 5/1980 | Edwards | 364/200 |
| 4,296,484 | 10/1981 | Miller | 367/77 |
| 4,493,063 | 1/1985 | Tims et al. | 367/77 |
| 4,516,206 | 5/1985 | McEvilly | 364/421 |

*Primary Examiner*—Jerry Smith
*Assistant Examiner*—Kimthanh Bui
*Attorney, Agent, or Firm*—Robert P. Cogan

[57] ABSTRACT

A reflection seismograph collects data received over a plurality of channels in a field location and provides data recorded on a recording medium for processing at a home data processing site in accordance with well-known algorithms. Data is collected over a plurality of channels and converted into a recordable form. In accordance with the present invention, the data is not coupled directly to recording means but is stored. Stored data is processed by a post acquisition processor so that a field operator may preview data to make a determination as to whether the data inputs are suitable to provide a desired result when processed at the home location. The operation may then actuate a means for recording the data onto the recording medium.

6 Claims, 1 Drawing Sheet

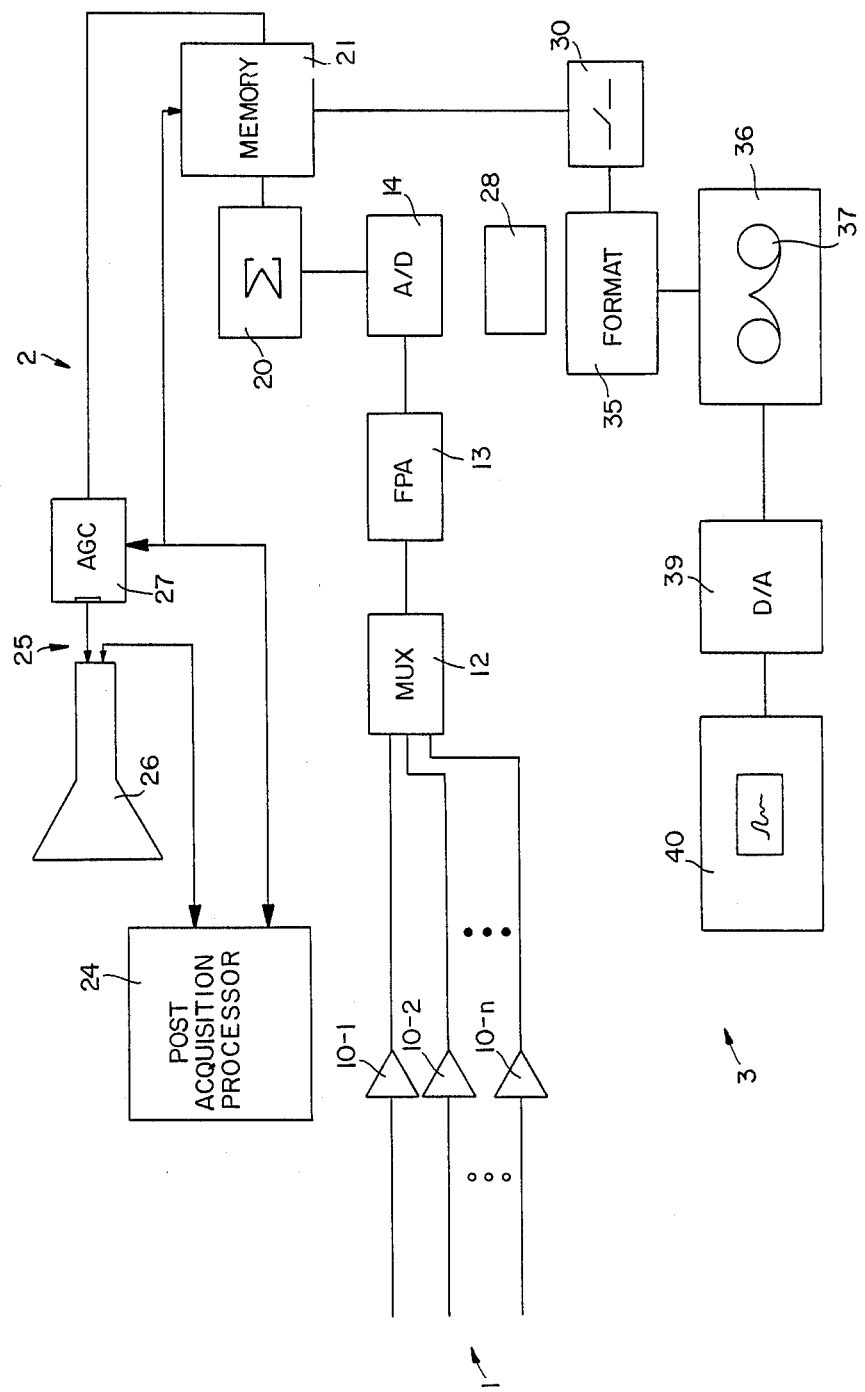

REFLECTION SEISMOGRAPH METHOD AND APPARATUS

BACKGROUND OF THE INVENTION

The present invention relates to reflection seismographs and more specifically to a method and apparatus for collecting seismographic data and providing the data on a recording medium.

Reflection seismographs are utilized to gather seismic data with respect to geologic formations. Commonly a field crew takes the reflection seismographic equipment into remote locations. A string of sensors is placed along a line. A mechanical energy source such as dynamite or a device such as a Vibroseis impact machine shakes the earth, and mechnical energy reflected form geological formations is reflected to the sensors. Information received by a group of sensors effectively provides a picture providing information with respect to a "slice" of the Earth. A plurality of such readings are repeated out on the field along a plurality of lines to map an entire area. Data representative of the measurement along each line is recorded onto magnetic medium. Magnetic media are shipped on a home data processing base where many different well-known data reduction programs are perfromed. Different data reduction algorithms are utilized to provide various sorts of surveys.

By the time the data is processed at the home data processing center, the field work has generally moved to another location or been completed. It may be either impossible orp rohibitively expensive to repeat the precise data acquisition routine shoud the home base find a problem with the data recorded on the medium. Many different parameters are utilized in processing the data that is gathered prior to its transmission to recording medium. The parameters include sampling times at which reflection signals are examined, high and low class filter frequencies, sensor spacing in the field and many other parameters. In reflection seismography, a great deal of manipulation may be employed either to optimize the appearance of data so as to make information regarding the geological formation most readily visible or to make it visible at all.

Further, even in situations in which all parameters are set as desired, particular data runs may still come out poorly. There are other situations in which elimination of unsuitable data is desired even if the data is not to be retaken. In some algorithms run at the processing base, in one bad data run processed in combination with good data runs will render the final composite good data useless. It is desirable to have a way to eliminate the bad data run from a total data package.

In current field processing, the multi-channel data is formated and delivered to recording medium before its quality is known. This increases the possibility of very expensive data collection expeditions having their utility seriously impaired.

SUMMARY OF THE INVENTION

It is therefore an object of the present invention to provide a method and apparatus in a reflection seismograph for selectively enabling recording of collected data on recording medium.

It is a further object of the present invention to provide a method of the type described in which seismic data which is collected and converted into a recordable form is stored and selectively transmitted to recording media.

It is a further object of the present invention to provide an apparatus of the type described in which means are provided for storing collected data, processing collected data according to a program which will yield a result indicative of suitability for use by data in a home data processing program and for selectively providing the collected data to recording means.

Briefly stated, in accordance with the present invention, there is provided a reflection seismograph with means for collecting seismic data and converting the seismic data into a form which is more suitable for a more easily evaluated. The data is stored in a memory. Prior to transmission to recording medium, the stored data is delivered to a post-acquisition processor and to means for reviewing the data as processed by the post-acquisition processor against preselected criteria. Means are then selectively operated for coupling collected data from the memory to formatting means and means for recording the data on recording medium.

BRIEF DESCRIPTION OF THE DRAWINGS

The means by which the foregoing objects and features of invention are achieved are pointed out with particularity in the claims forming the concluding portion of the specification. The invention, both as to its organization and manner of operation may be further understood by reference to the following description taken in connection with the following drawing.

The FIGURE is an illustration in block diagramatic form of a relfection seismograph constructed and utilized in accordance with the present invention.

DESCRIPTION OF THE PREFERRED EMBODIMENT

In the FIGURE, there is illustrated a reflection seismograph constructed in accordance with the present invention. Input data is received by a data acquisition section 1, is stored and in reviewed by a data processing section 2 and delivered to a recording section 3 in which formatted data is recorded on storage media and may be viewed by an ocillograph.

In the data acquisition section 1 a plurality of sensors (not shown) are each connected to an input amplifier circuit 10. A plurality of input amplifiers are provided in a well-known manner. The input amplifier circuits are denoted 10-1, 10-2 and 10-n. The dots between amplifier circuits 10-2 and 10-n indicate that a number of amplifier circuits may be provided. In one common embodiment, there are 28 channels with one amplifier circuit per channel. The input amplifier circuits 10 are connected to a multiplexer 12 which interfaces the received signals individually for conversion into a recordable form. The multiplexer 12 provides signals to a floating point amplifier 13 which provides an input indicative of signal amplitude to an analog to digital converter 14. The floating point amplifier 13, which may be of known construction, serves to keep the analog signal provided to the converter 14 within a range to maximize the usefulness of the output.

In the prior art, the output of the analog to digital converter 14 may be coupled for recording. Alternatively, where low energy seismic vibration sources are used, the outputs from the analog to digital converter 14 may be summed and stored for direct connection to recording means. However, in the present embodiment, the output indicative of recordable data is connected to and stored in the data processing section 2. As used in the present description, data acquisition describes the obtaining and storage of signals whose suitability for recording is to be determined. Recording is not included.

The output of the analog to digital converter 14 is connected to a summing circuit 20 having an output coupled to a memory 21. The summing circuit 20 is conventional and may be utilized particularly when mechanical vibration sources are used rather than dynamite and the input for each sensor must be summer over a number of cycles. The memory 21 stores the signals locally which may be later recorded on recording media for processing at a home data processing station. In accordance with the present invention, a post-acquisition processor 24 and data review utilization means 25 are provided. The post-acquisition processor 24 is connected for the reception of data from the memory 21 and to provide data to the utilization data review means 25. The post-acquisition processor 24 may also receive data from the utilization means 25. In the present embodiment, the utilization data review means 25 comprises a cathode ray tube display 26 and automatic gain control circuit 27.

The utilization means 25 is for enabling review of processed data ccording to criteria. For example, the review could comprise visual review by an operator and the criteria could comprise the judgment of the operator. Alternatively, the utilization means could comprise electronic measurement means for comparing an output waveform to pre-programmed limits. The memory may also provide an output for recording of data. Interfacing of the various stages in the data processing unit 2 is coordinated by a processor control means 28 embodied in a conventional manner according to the instruction manual of whichever processor is being utilized. The data output of the memory 21 is coupled to a switching means 30 which may be selectively operated to couple the output of the memory 21 to the data recording section 3.

The data recording section 3 includes a formating means 35 coupling data to recording means 36 which records on recording medium 37. Commonly, the recording medium 37 comprises reel-to-reel tape. Other recording medium may be utilized. The data to be recorded may also be coupled to a digital to analog converter 39 for viewing on an ocillograph 40. Viewing by the oscillograph 40 gives the operator an indication of the quality of data being recorded.

In use, the operator configures the recording system in a conventional manner. Each amplifier circuit 10 may be settable to adjust just parameters as notch filter, low-cut filter and anti-alias filter. Sample intervals may also be set. The parameters are set in accordance with known criteria to enhance the ability of the data to portray significant features of the underlying geology. Judicious selection of parameters can increase the effectiveness of the surveying process. Also, the spacing, number and spatial orientation of sensors may be adjusted.

Data may be coupled directly from the analog to digital 14 converter through the summer 20 to the memory. In the event the Vibroseis impact machine is used, it may take a number of cycles to build up a sufficient signal per location so that it is necessary for the summer 20 to be used a repeated number of times to provide a sufficient signal to the memory 21 per sensor. Delivery of the data to the memory 21 is essentially a conventional function. Once the data has been delivered to the memory 21, the post-acquisition processor 24 is used to do computer processing in the field to help the operator better evaluate the quality and interpret his data.

This is particularly significant. Survey users are accustomed to viewing seismic data which has been processed at a home data processing center. That final data includes such markedly improved signal in terms of signal-to-noise ratio that it often forgotten how unattractive the original field data may have looked. Such an improvement is made in later processing that a skilled user may not be able to determine in the field the suitability of the field data for its intended purpose. The processor 24 is not intended to be of the type used at the home processing center. Rather it is incorporatable in a reflection seismograph for the purpose of enabling a skilled operater to judge how final processing will improve the data. The processor 24 looks at the field data stored in the memory 21, does his computations, and displays the results on the display 26. The processor 24 may change display parameters while leaving the original data in the memory 21. Once the operator has evaluated the data, he may operate the switching means 30 to couple the data from the memory 21 to the formatting means 30 for recording in the recorder 36. Alternatively, he could rejet the data and clear the whole memory 21 or selected portions thereof. The control means 28 may be operated to perform the data rejection function.

In this manner, the data coupled and provided to the recording media 37 for processing at the home center is optimally reliable. Chances of a data run being useless are reduced. If a useless data run is detected, changes may be made while the crew is still in the field.

Commonly, the stored data transferred from the memory 21 to the recording media will be the data as initially stored. However, data as processed by the post acquisiton processor 24 may comprise the stored data. Selection may be made through use of the processor control means 28.

An example of a useful function in which suitability of parameters may be reviewed is the common depths point stack program. In this program, a slice of the Earth is pictured. A good stack is one providing a visible result in the final readout, where the particular reflection signals of interest are clearly visible.

Other programs which can be performed by the processor 24 include manual edit. This program allows an operator to reject a file. A file may include all data for a particular sensor or all sensors on one particular line. Also, specific traces from one file may be utilized. The purpose of this program is to prevent bad data from being used in other computations where one bad trace would destroy the results. The common depth point stack is an example of such a program.

Another suitable program is automatic noise reject. This program can edit traces to eliminate noise bursts based on a moving average. A moving average is an algorithm designed to make such noise bursts appear and which may be responded to to remove such noise bursts. If the operator finds the data not to be useable even after application of an automatic noise reject, he may discern that the current data in the memory 21 will not be suitable for use at the home data processing center and select not to utilize the switching means 30 to couple the data from the memory 21 for recording.

Another routine of the post-acquisition processor 24 is to generate a Vertical Seismic Profile section to provide preliminary data while the bore whole is still available. This may be run on real time during a survey.

Another routine of the post-acquisiton processor 24 is to filter digitally the preliminary data to eliminate signals outside the frequencies of interest, improving the signal to noise ratio.

What is thus provided is a system in which data is stored in memory, processed and judged against criteria prior to control whether or not there will be a transfer of the data to recording media.

What is claimed as new and desired to be secured by Letters Patent of the United States is:

1. In a reflection seismograph including a data acquistion section comprising input amplifier means for receiving signals from each of a plurality of sensors, the outputs of which collectively represent geological information for an area in which said sensors are disposed, means for coupling individual data signals to processing circuitry, processing circuitry for translating said data signals to outputs indicative of recordable data, and a memory circuitry for storing the outputs, whereby the memory contains contents representative of the geological information, the improvement of post acquisition processor comprising a processor means for accessing the contents of said memory and processing said contents in accordance with a program to provide processed data, utilization means coupled to said processor means responsive for reviewing processed data and means responsive to review performed with said utilization means for selectively providing or not providing the contents of said memory to further recording means.

2. The improvement according to claim 1 wherein said post-acquisition processor means comprises means for performing file editing with respect to contents for selective modification.

3. The improvement according to claim 2 wherein said utilization means comprises display means for displaying an output indicative of the signals as modified by said processor means for evaluation by an operator.

4. Improvement according to claim 3, wherein said display means comprise cathode ray tube display.

5. In a method for providing reflective seismographic data comprising acquiring the data over a plurality of channels, coupling the plurality of channels to means for providing all data thereby to conversion means, converting the data into storable processable from and, storing the data to provide stored data indicative of geological information for an area to which the sensors respond, the improvement of accessing the stored data, selectively applying a function to the accessed data to provide post-acquisiton data, reviewing the post-acquistion data, and in response to the review selectively providing or not providing the stored data to further recording means.

6. The improvement according to claim 5 wherein the step of selectively modifying comprises processing of data by a post-acquisition processor.

* * * * *